(12) United States Patent
Ohga

(10) Patent No.: US 6,499,374 B1
(45) Date of Patent: Dec. 31, 2002

(54) BALL SCREW WITH ALTERNATELY DISPOSED STEEL BALLS AND CERAMIC BALLS

(75) Inventor: Soichiro Ohga, Nara-ken (JP)

(73) Assignee: Tsubaki Nakashima Co., Ltd., Nara-Ken (JP)

( * ) Notice: Subject to any disclaimer, the term of this patent is extended or adjusted under 35 U.S.C. 154(b) by 0 days.

(21) Appl. No.: 09/918,291

(22) Filed: Jul. 30, 2001

(51) Int. Cl.[7] ............................................. F16H 25/22
(52) U.S. Cl. ................................... 74/424.82; 74/424.88
(58) Field of Search .......................... 74/424.81, 424.82, 74/424.83, 424.84, 424.88, 424.89

(56) References Cited

U.S. PATENT DOCUMENTS

| | | | |
|---|---|---|---|
| 5,467,662 A | * 11/1995 | Lange et al. | 74/424.83 |
| 5,615,955 A | * 4/1997 | Namimatsu et al. | 384/13 |
| 5,782,135 A | * 7/1998 | Kondo et al. | 74/89.44 |

OTHER PUBLICATIONS

"Applied Technique of Ball Screw", 1st edition, published by Kogyo Chosakai, Ltd. (May 20, 1993), pp. 18–21 and pp. 49–51 Also pp. 117–121.

Junzo Okamoto: "Calculation of Ball Bearings"; Sep. 1999; pp. 2–5 and pp. 8–9.

"Technology of Rolling Bearings"; compiled by Compilation Committee of the Technology of Rolling Bearings, 1st edition, (Jul. 10, 1975), published by Yokendo Co., Ltd.; pp. 381–384.

"Tsubaki Nakashima General Catalog", 1st edition (Apr. 1, 1996), pp. A–36 to A–37.

* cited by examiner

*Primary Examiner*—William C Joyce
(74) *Attorney, Agent, or Firm*—Howson and Howson

(57) ABSTRACT

A ball screw comprising a screw shaft 1 made of steel and having a thread groove 6 on outer peripheral surface, a ball nut 2 made of steel and having a thread groove 7 opposing the thread groove 6 on inner peripheral surface, a return tube 3 attached on the ball nut 2, and a plurality of balls inserted between the two thread grooves 6 and 7 and in the return tube 3. As the balls, steel balls 4 made of bearing steel and ceramic balls 5 made of silicon nitride are disposed alternately at a given ratio. Diameter Dc of the ceramic ball 5 is set to a value smaller than diameter Ds of the steel ball 4 so that contact stress acted on contact surfaces of the ceramic ball 5 and the two thread grooves 6 and 7 will be equal to contact stress acted on contact surfaces of the steel ball 4 and the two thread grooves 6 and 7.

1 Claim, 6 Drawing Sheets

BALL SCREW WITH ALTERNATELY DISPOSED STEEL BALLS AND CERAMIC BALLS

BACKGROUND OF THE INVENTION

1. Field of the Invention

The present invention relates to a ball screw used in a feed system of machine tools, general industrial machinery and the like. In particular, the invention relates to a ball screw suitable for high-speed feed motion.

2. Description of the Related Art

In general, a ball screw comprises a screw shaft having a thread groove on outer peripheral surface, a ball nut having a thread groove on inner peripheral surface opposed to the thread groove of the screw shaft and a plurality of balls to be inserted between the two thread grooves and recirculated along a ball circulation passage provided in the ball nut. So as to form ball circulation passage, return tube type, insert piece type, end cap type or guide plate type is adopted. In the ball screw used in the application for the positioning with high accuracy, a ball screw is held under a preload so that the axial clearance in the ball screw is eliminated and the rigidity of the ball screw may become larger with the lesser elastic displacement under the axial load. In addition, the two thread grooves are formed generally in form of gothic arc. The methods to apply preloading are roughly divided to: fixed position preloading and fixed pressure preloading (to apply tensile preloading with a spring between two ball nuts). As the fixed position pre-loading, over-sized ball preloading method or lead-shift preloading method is adopted in case of single nut. In case of double-nut, tensile preloading method to insert a thick spacer to match the preloading amount between the two ball nuts or compression preloading method to insert a thin spacer to match the preloading amount is adopted. (For instance, see: Minoru Izawa: "Applied Technique of Ball Screw", 1st edition, published by Kogyo Chosakai, Ltd. (May 20, 1993), pp.18–21 and pp.49–51.)

In such a type of ball screw, chromium-molybdenum steel SCM415H or SCM420 H (JIS G 4105) is used as the material for the screw shaft and the ball nut. Surface hardness is held in HRC 58–62 (Hv 650–740) by carburizing and quenching and by tempering. As the ball to bear the axial load, steel balls for ball bearings (JIS B 1501) made of high carbon chromium bearing steel SUJ2 (JIS G 4805) is used. (Hereinafter, the steel balls for ball bearings is referred as "steel balls".) When preloading or pressurization is applied on the ball screw, spacer steel balls with diameter of several tens of $\mu$m smaller than the diameter of steel balls are often disposed at a rate of every one ball, every two balls, or every three balls with the purpose of suppressing the increase of friction torque caused by jamming of steel balls against each other. Also, the screw shaft made of carbon steel AISI 4150H or S55C (JIS G 4051) and processed by induction hardening is often used.

In the ball screw with "only steel balls" inserted in it, there have been problems as given below when high-speed feeding is performed at 60 m/min. or more, for instance.

① Heat generation is increased, and this induces elongation of the screw shaft due to temperature increase. The elongation of the screw shaft leads to poor positioning accuracy.

② When preloading is applied on the ball screw, the pre-load value increases due to thermal expansion of the steel balls or centrifugal force acting upon the steel balls when the screw shaft is rotated at high speed. The increase of the preload value leads to further increase of heat generation. That is, elongation of the screw shaft is increased, and this results in still poorer positioning accuracy.

③ Noise during ball screw operation is increased.

④ In case of the return tube type ball screw:

(i) Balls (steel balls or ceramic balls as to be described later) are separated from thread grooves on the screw shaft and these balls hit the tongue of the return tube when the balls enter the return tube. The increased hitting force of steel balls may repeatedly exerts action on the tongue, and the tongue may be damaged in many cases. (For instance, see "Applied Technique of Ball Screw", ibid., pp.117–121.)

(ii) In the ball screw, a certain fluctuation or variation occurs in the circulating movement of balls due to deviation caused in fabrication and assembling stages. For this reason, the balls discharged from the return tube hit a portion near the land (cylindrical outer periphery of the screw shaft) of the thread groove of the screw shaft, and the balls are then caught in the thread grooves. The increased collision force of the steel balls repeatedly exerts action on a portion near the land and this results in damage on the thread grooves. As a result, practical service life of the ball screw is shortened.

As one of the means to solve the above problems, ceramic balls made of silicon nitride ($Si_3N_4$) with lower density and lower linear expansion coefficient than steel balls as shown in Table 1 (hereinafter referred as "ceramic balls") are used instead of the steel balls.

TABLE 1

| Characteristic values of ceramic ball and steel ball | | |
|---|---|---|
| | Ceramic ball ($Si_3N_4$) | Steel ball (SUJ2) |
| Density [g/cm$^3$] | 3.2 | 7.8 |
| Hardness [Hv] | 1700–1800 | 700–800 |
| Linear expansion coefficient [×10$^{-6}$/° C.] | 3.2 | 12.5 |
| Modulus of longitudinal elasticity [GPa] | 310 | 210 |
| Poisson's ratio | 0.25 | 0.3 |
| Thermal conductivity [cal/cm · s · ° C.] | 0.07 | 0.1 |

However, in the ball screw with "only ceramic balls" inserted in it, there have been the following problems:

① When preloading or pressurization is applied on the ball screw and high-speed feeding is performed, temperature increase is relatively lower compared with the case where only the steel balls are inserted. However, axial clearance is apt to occur and then preload is lost, which will result in poorer positioning accuracy. The reason to cause the axial clearance is that the diameter of ceramic ball is smaller compared with sizes of the screw shaft and the ball nut made of steel (linear expansion coefficient: 11.9×10$^{-6}$/°C.), and linear expansion coefficient is also lower. As a result, it is more likely to be subjected to the influence of temperature increase.

② Compared with the ball screw with only the steel balls inserted, the screw shaft has generally shorter service life. This is attributed to the fact that, if steel ball and ceramic ball have the same diameter, when the same axial load (i.e. the same magnitude of rolling element load) is applied, contact surface area of the ceramic balls and the two thread grooves is smaller than that of the steel balls. As a result, high contact stress is caused on contact surface, and this leads to shorter service life of the thread grooves (according to the elastic contact theory by Hertz).

③ When a rotating screw shaft is stopped and is rotated in reversed direction, shock load is applied on contact surface of balls (steel balls or ceramic balls) and the two thread grooves. (The higher the rotating speed of the screw shaft is, the higher the shock load is.) Ceramic balls are harder than steel balls and have higher modulus of longitudinal elasticity than steel balls (See Table 1 above), and indentation is more likely to occur on the thread grooves due to the shock load. As a result, noise during ball screw operation is increased, and service life of the thread grooves is decreased due to indentation. Thus, ceramic balls are inferior to steel balls in the shock resistance of the thread grooves.

④ Ceramic balls are very expensive in cost compared with steel balls. For instance, in case of a ball with nominal diameter of ¼ inch (6.35 mm), market price of steel ball is about 0.8 yen/piece, while that of ceramic ball is 20 yen or more/piece.

SUMMARY OF THE INVENTION

It is an object of the present invention to provide a ball screw, by which it is possible to overcome the above problems in the conventional type ball screw with "only steel balls" or "only ceramic balls" inserted in it and which is suitable for the application of high-speed feed motion.

The present invention provides a ball screw, which comprises a screw shaft made of steel and having a thread groove on outer peripheral surface, a ball nut made of steel and having a thread groove on inner peripheral surface opposed to the thread groove of the screw shaft and a plurality of balls inserted between the two thread grooves and to be recirculated along a ball circulation passage provided in the ball nut, whereby the steel balls made of bearing steel and the ceramic balls made of silicon nitride are disposed alternately at a given ratio as the balls, and diameter of the ceramic balls is set to a value smaller than diameter of the steel balls so that contact stress acted on contact surface of the ceramic balls and the two thread grooves will be equal to contact stress acted on contact surface of the steel balls and the two thread grooves.

According to the present invention, when high-speed feeding is performed:

(1) In comparison with the conventional type ball screw with "only steel balls" inserted:
  ① Heat generation is low, and elongation of the screw shaft due to temperature increase can be reduced. Also, when preloading is applied on the ball screw, it is possible to suppress the increase of preload value caused by temperature increase due to high-speed rotation of the screw shaft. Therefore, positioning accuracy as required can be maintained.
  ② Noise during ball screw operation can be reduced.
  ③ In case of a return tube type ball screw, the probability to damage the tongue of the return tube can be reduced. Also, damage on the thread groove of the screw shaft can be minimized.

(2) In comparison with the conventional type ball screw with "only ceramic balls" inserted:
  ① When preloading is applied on the ball screw, even when preload is lost as result of occurrence of axial clearance between the ceramic balls and the two thread grooves due to temperature increase, the preload between the steel ball and the two thread groove is not lost. As a result, positioning accuracy as required can be maintained. Also, in this case, the ceramic balls serve as spacer balls, and this contributes to the improvement of workability during high-speed feeding. When the insertion ratio of the steel balls to the ceramic balls is set to 1:1, the axial load to be born is decreased to one-half. Thus, it is preferable to set the insertion ratio to 2:1 or 3:1.
  ② Service life will be extended. That is, it will be as long as the service life of the ball screw with "only steel balls" inserted.
  ③ ceramic balls and thread grooves come closer to each other by elastic approach after elastic approach occurs between the steel balls and the thread grooves. Thus, even when shock load is applied, indentation hardly occurs on the thread grooves.
  ④ Production costs may be suppressed.

BRIEF DESCRIPTION OF THE DRAWINGS

FIG. 2 represents longitudinal sectional views showing a screw shaft and thread grooves on a ball nut and also showing contact condition of steel balls and two thread grooves or ceramic balls and two thread grooves when axial load is applied thereon.

FIGS. 3 (a), (b), and (c) each represents a case where insertion ratio of steel balls and ceramic balls is 1:1, 2:1 and 3:1 respectively.

FIG. 4 represents longitudinal sectional views of principal curvature planes 1 and 2 in the contact between steel balls and thread grooves of a screw shaft or between ceramic balls and thread grooves of the screw shaft.

DESCRIPTION OF THE PREFERRED EMBODIMENTS

Figure 1:
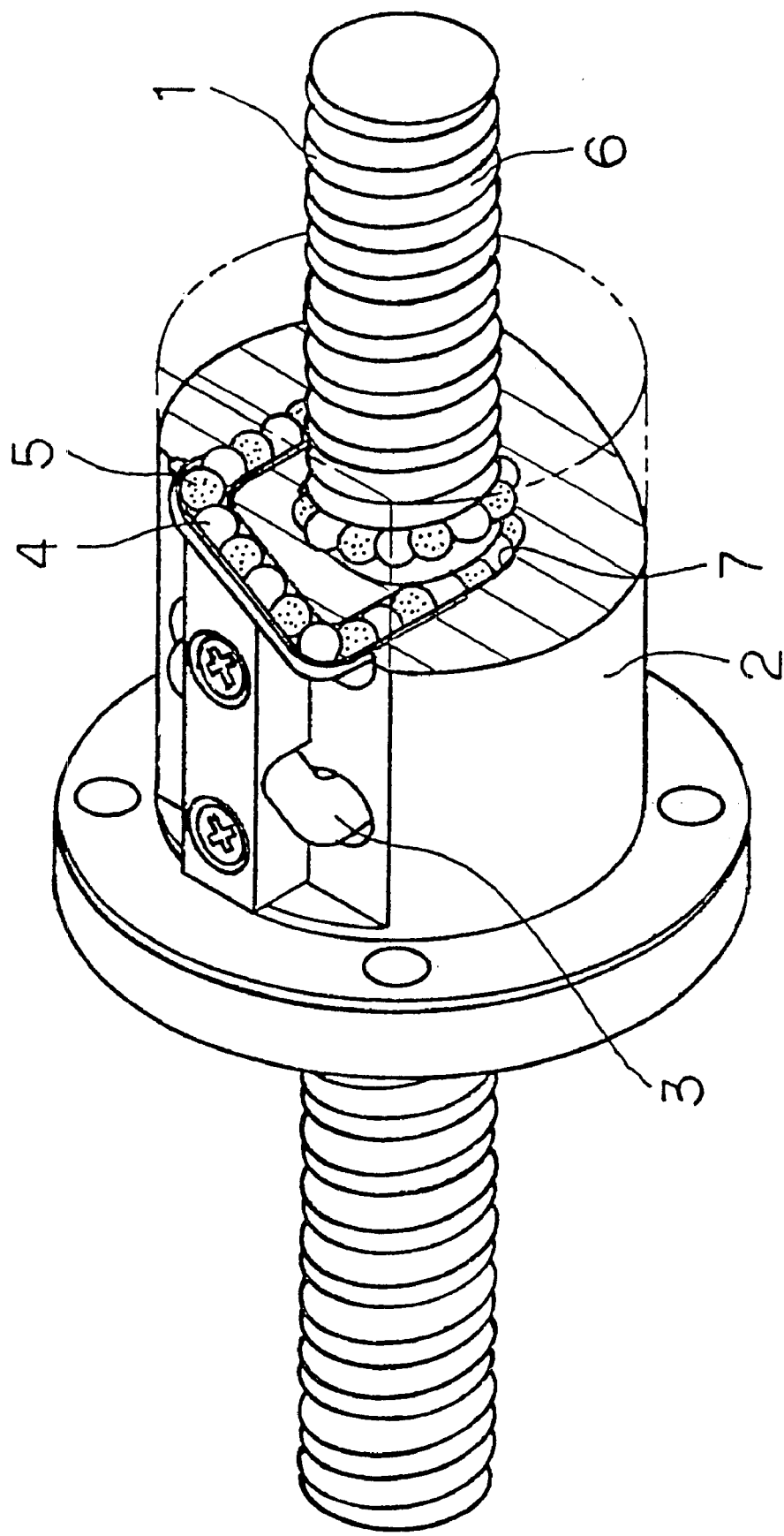
FIG. 1 is a partially cutaway perspective view of an embodiment of a ball screw according to the present invention.

Description will be given below on embodiments of the present invention referring to the drawings.

Figure 2A:
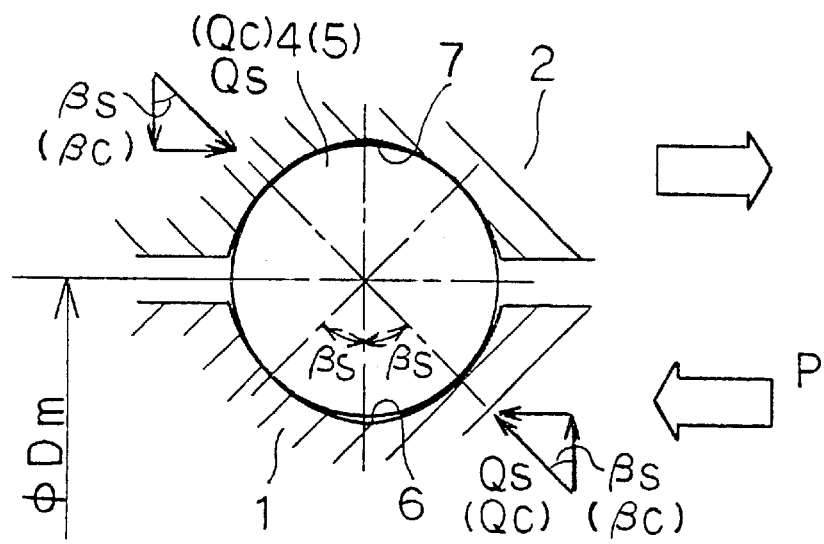
FIG. 2(a) shows a case where a single nut is used and axial clearance is eliminated or a case of over-sized balls under preloading.
Figure 2B:
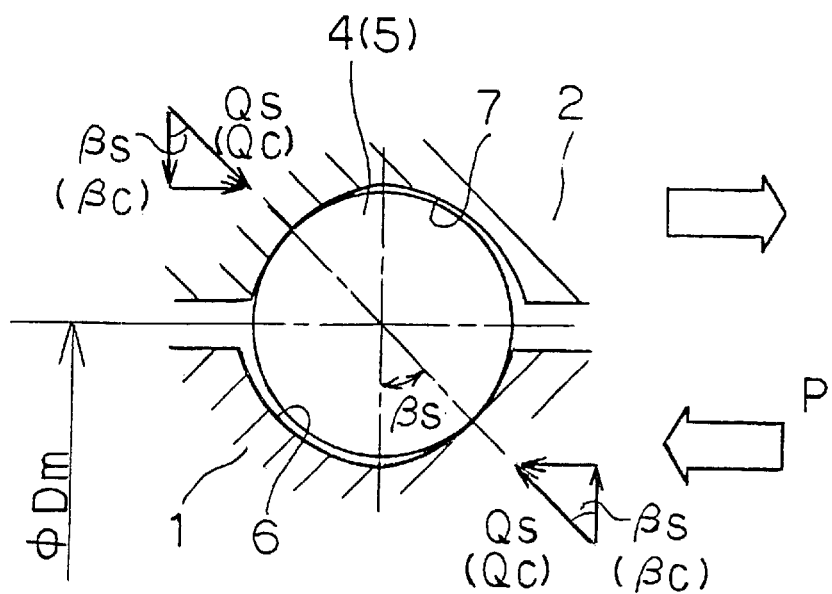
FIG. 2(b) shows a case where a single nut is used with axial clearance or a case of lead-shift with preloading or a case of double-nut with pre loading (not shown). (In the figures, only a side to bear the axial load is shown.)

FIG. 1 shows an embodiment of a ball screw of the present invention. The ball screw is a single nut type, wherein axial clearance is eliminated as shown in FIG. 2(a), or a non-preloaded ball screw with a given axial clearance as shown in FIG. 2(b) (a case where axial load is applied). FIG. 2(a) is a longitudinal sectional view showing contact condition between the steel balls 4 and two thread grooves 6 and 7 or between the ceramic balls 5 and two thread grooves 6 and 7 in case of an over-sized ball under preloading, which will be described later. FIG. 2(b) is a longitudinal sectional view showing contact condition between the steel balls 4 and the two thread grooves 6 and 7 or between the ceramic balls 5 and the two thread grooves 6 and 7 in case of the lead-shift under preloading or a case of double-nut under preloading (not shown). (Only the side to bear the axial load is shown.).

Figure 3A:
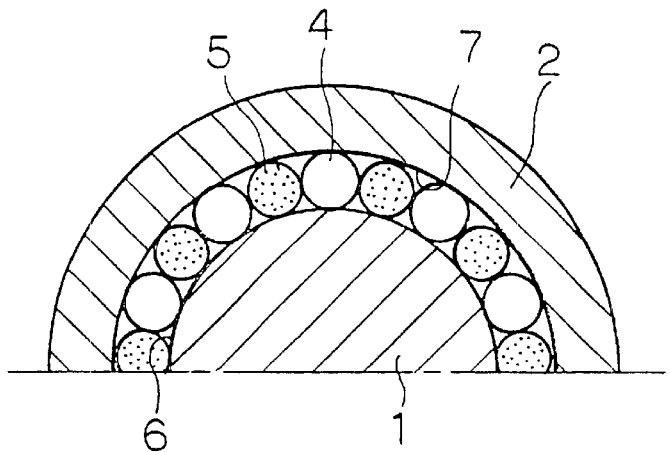
FIG. 3 represents cross-sectional views showing an arrangement of steel balls and ceramic balls.
Figure 3B:
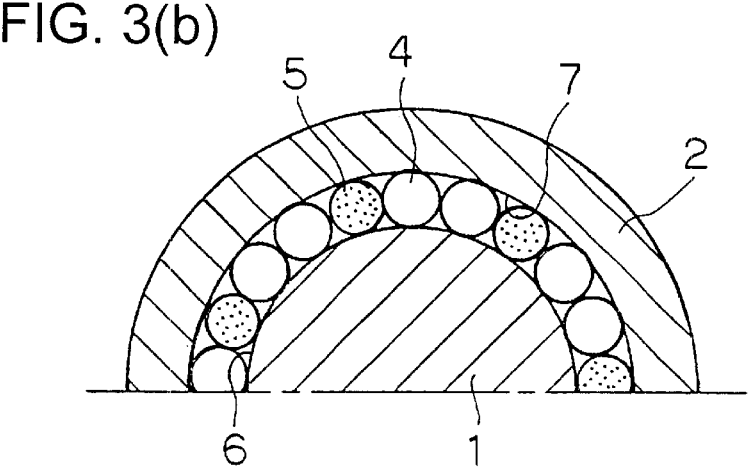
Figure 3C:
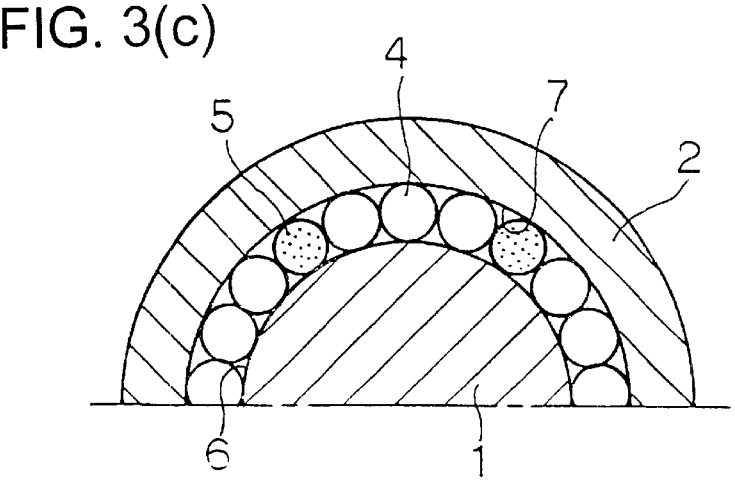

On outer peripheral surface of a screw shaft 1, a thread groove 6 in form of gothic arc is formed. On inner peripheral surface of a ball nut 2, through which the screw shaft is inserted, a thread groove 7 in form of gothic arc opposing the thread groove 6 is formed. In the ball nut 2, a return tube 3, serving as a ball circulation passage, is provided. As shown in FIG. 1 and FIG. 3(a), a plurality of steel balls 4 and ceramic balls 5 having characteristic values as shown in Table 1 are alternately inserted at a ratio of 1:1 between the two thread grooves 6 and 7 and in the return tube 3. If it is assumed that diameters of the steel ball 4 and the ceramic ball 5 are Ds and Dc respectively, the diameter Dc of the ceramic ball 5 is designed to be smaller than the diameter Ds of the steel ball 4 so that contact stress to be acted on each of contact surfaces of the ceramic ball 5 and the two thread grooves 6 and 7 will be equal to contact stress to be acted on contact surfaces of the steel ball 4 and the two thread grooves 6 and 7. (See FIG. 5.) The screw shaft 1 and the ball nut 2 are made of chromium-molybdenum steel SCM415H or SCM420H. Surface hardness is designed to be HRC 58–62 after being processed by carburizing and quenching and by tempering. If it is assumed that the fitting rate between the steel balls 4 and the two thread grooves 6 and 7 is f (f=0.52–0.58), radius of curvature of the two thread grooves 6 and 7 is f·Ds. Further, the insertion ratio of the steel balls 4 and the ceramic balls 5 may be set to 2:1 or 3:1 as shown in FIG. 3(b) and FIG. 3(c).

Next, description will be given on a method to set the diameter Dc [mm] of the ceramic ball 5 with respect to the diameter Ds [mm] of the steel ball 4.

As shown in FIG. 2, when an axial load P [N] is applied on the ball screw, a rolling element load Qs [N] perpendicular to the contact surface is caused on the contact surfaces of the steel ball 4 and the two thread grooves 6 and 7. Similarly, a rolling element load Qc [N] smaller than the rolling element load Qs [N] and perpendicular to the contact surface is caused on contact surfaces of the ceramic ball 5 and the two thread grooves 6 and 7. The rolling element loads Qs and Qc [N] and the axial load P [N] satisfy the relationship of each of the following equations (1)–(3).

Here, it is supposed that total number of effective turns of the ball screw to bear the axial load P [N] (i.e. "number of effective turns in a circuit" "number of circuits") is T, and that numbers of the steel balls 4 and the ceramic balls 5 in the total number of effective turns T are Ms and Mc respectively:

$$Ds \cdot Ms + Dc \cdot Mc \approx T \cdot \sqrt{(\pi \cdot Dm)^2 + L^2} \quad (1)$$

$$P = Qs \cdot \sin\beta s \cdot Ms + Qc \cdot \sin\beta c \cdot Mc \quad (2)$$

$$Ms = \begin{cases} 1 \cdot Mc & \text{[Insertion ratio 1:1]} \\ 2 \cdot Mc & \text{[Insertion ratio 2:1]} \\ 3 \cdot Mc & \text{[Insertion ratio 3:1]} \end{cases} \quad (3)$$

where
Dm: Diameter of center circle of steel ball 4 and ceramic ball 5 [mm]
L: Lead [mm]
$\beta s$: Contact angle between steel ball 4 and two thread grooves 6 and 7 [°]
$\beta c$: Contact angle between ceramic ball 5 and two thread grooves 6 and 7 [°]

Here, one circuit, number of effective turns, and number of circuits are defined respectively as follows: one closed circuit between the two thread grooves 6 and 7 and in the return tube 3 where the steel balls 4 and the ceramic balls 5 are alternately inserted, number of turns of the steel balls 4 and the ceramic balls 5 around the screw shaft 1 in one circuit, and number of circuits incorporated in it. The contact angles $\beta s$ and $\beta c$ are set to near 45° in most cases.

Figure 4B:
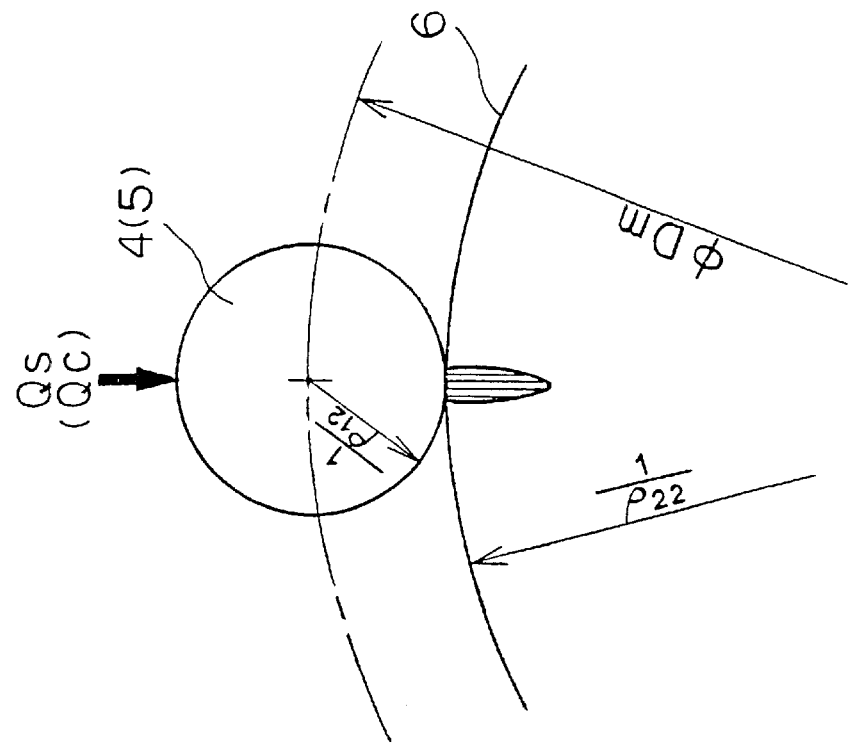
FIG. 4(a) and FIG. 4(b) each shows a case when the principal curvature plane 1 is seen from direction of revolution of the steel balls and the ceramic balls, and a case when the principal curvature plane 2 is seen from a direction perpendicular to the principal curvature plane 1.
Figure 4A:
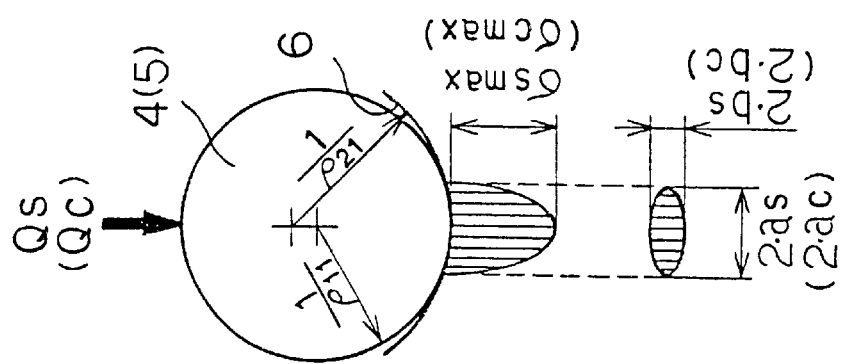
Figure 5:
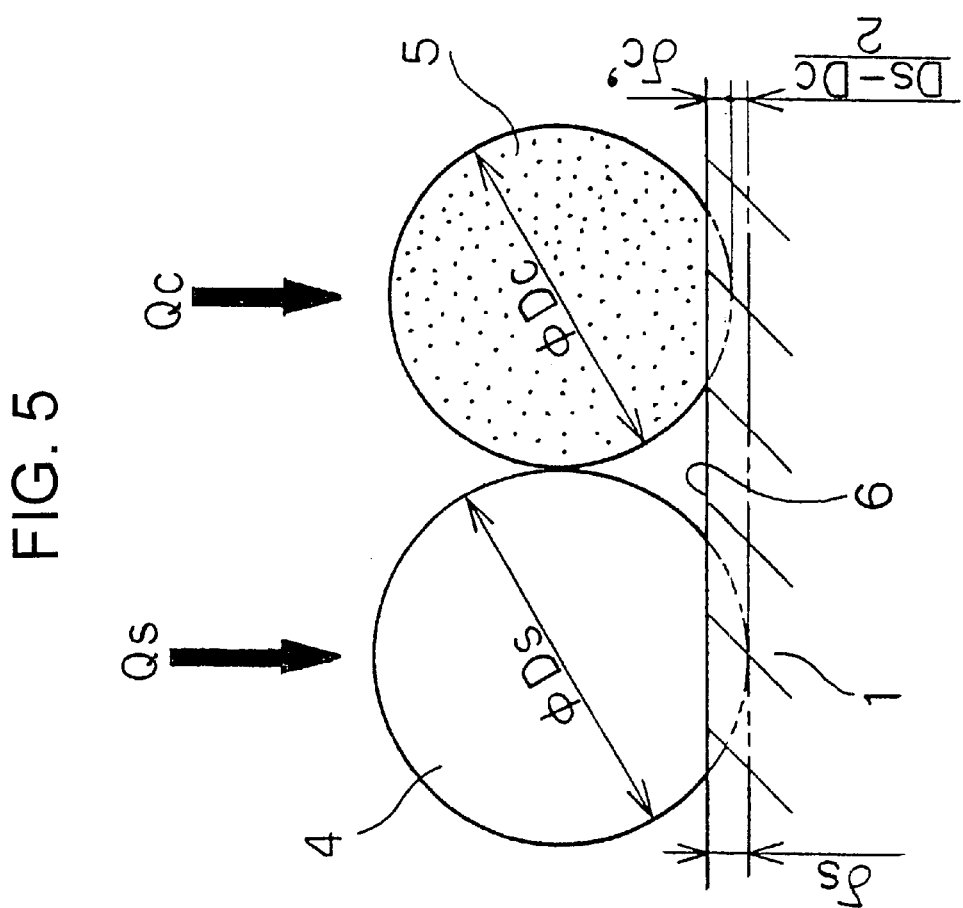
FIG. 5 is a schematic drawing to show geometrical relationship in the contact between the steel balls and the thread grooves of the screw shaft and between the ceramic balls and the thread grooves of the screw shaft.

As shown in FIG. 4 and FIG. 5, elastic deformation occurs due to the rolling element load Qs [N], and the steel ball 4 comes closer to the thread groove 6 by $\delta s$ [mm] due to elastic approach (elastic displacement). Contact surface of these two is a contact ellipse having long axis radius $a_s$ [mm] and short axis radius $b_s$ [mm]. At the central portion, maximum contact stress $\sigma_{s\ max}$ [N/mm²] is caused. Similarly, elastic deformation occurs due to the rolling element load Qc, and the ceramic ball 5 and the thread groove 6 come closer to each other by $\delta c$ [mm] due to elastic approach. Contact surface of these two is turned to a contact ellipse having long axis radius $a_c$ [mm] and short axis radius $b_c$ [mm]. At the central portion, maximum contact stress $\sigma_{c\ max}$ [N/mm²] is caused. In FIG. 5, elastic approach amount $\delta c'$ between the ceramic ball 5 and the thread groove 6 is obtained by projecting the elastic approach amount $\delta c$ on the contact angle $\beta c$ to the contact angle $\beta s$. Because the difference between $\delta c'$ and $\delta c$ is minimal, it is assumed that $\delta c' \approx \delta c$. Also, as to be described later, principal curvature on the principal curvature plane 2 is different from principal curvature of the thread groove 6, and this is not an accurate solution. However, from the viewpoint to simplify calculation formula to obtain the value of the diameter Dc of the ceramic ball 5, it is assumed that the contact condition between the steel ball and the thread groove 7 and between the ceramic ball 5 and the thread groove 7 is the same as the contact condition between these balls and the thread groove 6. These are not shown in the figures for the same reason as given above.

The long axis radii $a_s$ and $a_c$ [mm], the short axis radii $b_s$ and $b_c$ [mm], maximum contact stress $\sigma_{s\ max}$ and $\sigma_{c\ max}$ [N/mm²], and the elastic approach amounts $\delta s$ and $\delta c$ [mm] can be obtained as given below. (For instance, reference should be made to: Junzo Okamoto: "Calculation of Ball Bearings"; September 1999; pp.2–5 and pp.8–9.).

It is assumed here that what are shown in FIG. 4(a) and FIG. 4(b) are the principal curvature plane 1 and the principal curvature plane 2 respectively in the elastic contact theory by Hertz. Also, it is supposed that the values of principal curvatures of the principal curvature planes 1 and 2 of balls (steel balls 4 or the ceramic balls 5) are $\rho_{11}$ and $\rho_{12}$ respectively, and that the values of principal curvature on the principal curvature planes 1 and 2 of the thread groove 6 are $\rho_{21}$ and $\rho_{22}$ respectively. Then, the values $\rho_{11}$, $\rho_{12}$, $\rho_{21}$ and $\rho_{22}$ are as shown in Table 2.

TABLE 2

| | Principal curvatures of principal curvature surfaces 1 and 2 | |
|---|---|---|
| | Steel ball 4 and thread groove 6 | Ceramic ball 5 and thread groove 6 |
| $\rho_{11}$ | $\dfrac{2}{Ds}$ | $\dfrac{2}{Dc}$ |
| $\rho_{12}$ | $\dfrac{2}{Ds}$ | $\dfrac{2}{Dc}$ |
| $\rho_{21}$ | $-\dfrac{1}{f \cdot Ds}$ | $-\dfrac{1}{f \cdot Ds}$ |
| $\rho_{22}$ | $\dfrac{2 \cdot \cos\beta s}{Dm - Ds \cdot \cos\beta s}$ | $\dfrac{2 \cdot \cos\beta c}{Dm - Dc \cdot \cos\beta c}$ |

Under the contact condition between the steel ball 4 and the thread groove 7 and between the ceramic ball 5 and the thread groove 7, the values of the principal curvature $\rho_{11}$, $\rho_{12}$ and $\rho_{21}$ are as shown in Table 2. Only the value of the principal curvature $\rho_{22}$ of the thread groove 7 differs as given below:

| | Steel ball 4 and thread groove 7 | Ceramic ball 5 and thread groove 7 |
|---|---|---|
| $\rho_{22}$ | $-\dfrac{2 \cdot \cos\beta s}{Dm + Ds \cdot \cos\beta s}$ | $-\dfrac{2 \cdot \cos\beta c}{Dm + Dc \cdot \cos\beta c}$ |

For this reason, the values of maximum contact stress in the contact between the steel ball 4 and the thread groove 7 and between the ceramic ball 5 and the thread groove 7 are smaller than the values of maximum contact stress $\sigma_{s\ max}$ and $\sigma_{c\ max}$ in the contact between these balls and the thread groove 6.

Then, the value of ancillary variable $\cos \tau$ can be calculated from the following equation based on the above Table 2.

$$\cos \tau = \frac{|\rho_{11} - \rho_{12}| + |\rho_{21} + \rho_{22}|}{\sum \rho} \quad (4)$$

where $$\Sigma\rho = \rho_{11} + \rho_{12} + \rho_{21} + \rho_{22} \quad (5)$$

From the value of this ancillary variable $\cos \tau$, the values of long axis radius a [mm] and short axis radius b [mm] of the contact ellipse, maximum contact stress $\sigma_{max}$ [N/mm²], and elastic approach amount $\delta$ [mm] can be obtained as given in the equations given below. Here, Q represents rolling element load.

$$a = \mu \cdot \sqrt[3]{\frac{3}{2} \cdot \left\{\frac{1-(1/m_1)^2}{E_1} + \frac{1-(1/m_2)^2}{E_2}\right\} \cdot \frac{Q}{\sum \rho}} \quad (6)$$

$$b = \nu \cdot \sqrt[3]{\frac{3}{2} \cdot \left\{\frac{1-(1/m_1)^2}{E_1} + \frac{1-(1/m_2)^2}{E_2}\right\} \cdot \frac{Q}{\sum \rho}} \quad (7)$$

$$\sigma_{max} = \frac{3}{2} \cdot \frac{Q}{\pi \cdot a \cdot b} \quad (8)$$

$$\delta = \frac{2 \cdot K}{\pi \cdot \mu} \cdot \sqrt[3]{\frac{1}{8} \times \left(\frac{3}{2}\right)^2 \cdot \left\{\frac{1-(1/m_1)^2}{E_1} + \frac{1-(1/m_2)^2}{E_2}\right\} \cdot \left(\sum \rho\right) \cdot Q^2} \quad (9)$$

where $$\mu, \nu, = \frac{2 \cdot K}{\pi \cdot \mu} :$$

Coefficients relating to $\cos \tau$ $E_1$: Modulus of longitudinal elasticity of ball [GPa]

$E_2$: Modulus of longitudinal elasticity of thread groove 6 [GPa]

$1/m_1$: Poisson's ratio of ball $1/m_2$: Poisson's ratio of thread groove 6

The values of the coefficients $\mu$ and $\nu$ and $2 \cdot K/\pi \cdot \mu$ can be obtained by linear interpolation from the table in: "Technology of Rolling Bearings"; compiled by Compilation Committee of the Technology of Rolling Bearings, 1st edition, (Jul. 10, 1975), published by Yokendo Co., Ltd.; pp.381–384).

When the steel ball 4 comes into contact with the thread groove 6, $E_1 = E_2 = 210$ [GPa] $= 210 \times 10^3$ [N/mm²] and $1/m_1 = 1/m_2 = 0.3$. (See the above Table 1.) Then, the above equations (4)–(9) can be changed as given below. Here, $\cos \tau$, $\Sigma\rho$, a, b, $\sigma_{max}$, $\delta$, $\mu$, $\nu$, $2 \cdot K/\pi \cdot \mu$, and Q are substituted by $\cos \tau_s$, $\Sigma\rho_s$, $a_s$, $b_s$, $\sigma_{s\ max}$, $\delta s$, $\mu_s$, $\nu_s$, $2 \cdot K_s/\pi \cdot \mu_s$ and Qs.

$$\cos \tau_s = \frac{\dfrac{1}{f \cdot Ds} + \dfrac{2 \cdot \cos \beta_s}{Dm - Ds \cdot \cos \beta_s}}{\sum \rho_s} \quad (10)$$

$$\sum \rho_s = \frac{2}{Ds} + \frac{2}{Ds} - \frac{1}{f \cdot Ds} + \frac{2 \cdot \cos \beta_s}{Dm - Ds \cdot \cos \beta_s} \quad (11)$$

$$a_s = 2.35133 \times 10^{-2} \cdot \mu_s \cdot \sqrt[3]{\frac{Qs}{\sum \rho_s}} \quad (12)$$

$$b_s = 2.35133 \times 10^{-2} \cdot \nu_s \cdot \sqrt[3]{\frac{Qs}{\sum \rho_s}} \quad (13)$$

$$\sigma_{s\ max} = \frac{3}{2} \cdot \frac{Qs}{\pi \cdot a_s \cdot b_s} \quad (14)$$

$$= \frac{1.5}{\pi} \times \frac{1}{(2.35133 \times 10^{-2})^2} \cdot \frac{\left(\sqrt[3]{\sum \rho_s}\right)^2 \cdot \sqrt[3]{Qs}}{\mu_s \cdot \nu_s}$$

$$\delta s = 2.76439 \times 10^{-4} \cdot \frac{2 \cdot K_s}{\pi \cdot \mu_s} \cdot \sqrt[3]{\left(\sum \rho_s\right) \cdot Qs^2} \quad (15)$$

Also, in case of the contact between the ceramic ball 5 and the thread groove 6, $E_1 = 310$ [GPa] $= 310 \times 10^3$ [N/mm²], $E_2 = 210$ [GPa] $= 210 \times 10^3$ [N/mm²], $1/m_1 = 0.25$, $1/m_2 = 0.3$. (See Table 1 above.) Thus, the above equations (4)–(9) can be changed as given below. Here, $\cos \tau$, $\Sigma\rho$, a, b, $\sigma_{max}$, $\delta$, $\mu$, $\nu$, $2 \cdot K/\pi \cdot \mu$ and Q are substituted by $\cos \tau_c$, $\Sigma\rho_c$, $a_c$, $b_c$, $\sigma_{c\ max}$, $\delta c$, $\mu_c$, $\nu_c$, $2 \cdot K_c/\pi \cdot \mu_c$, and Qc.

$$\cos \tau_c = \frac{\frac{1}{f \cdot Ds} + \frac{2 \cdot \cos \beta_c}{Dm - Ds \cdot \cos \beta_c}}{\sum \rho_c} \quad (16)$$

$$\sum \rho_s = \frac{2}{Dc} + \frac{2}{Dc} - \frac{1}{f \cdot Ds} + \frac{2 \cdot \cos \beta_c}{Dm - Dc \cdot \cos \beta_c} \quad (17)$$

$$a_c = 2.22642 \times 10^{-2} \cdot \mu_c \cdot \sqrt[3]{\frac{Qc}{\sum \rho_c}} \quad (18)$$

$$b_s = 2.22642 \times 10^{-2} \cdot \nu_c \cdot \sqrt[3]{\frac{Qc}{\sum \rho_c}} \quad (19)$$

$$\sigma_{c\,max} = \frac{3}{2} \cdot \frac{Qc}{\pi \cdot a_c \cdot b_c} \quad (20)$$

$$= \frac{1.5}{\pi} \times \frac{1}{(2.22642 \times 10^{-2})^2} \cdot \frac{\left(\sqrt[3]{\sum \rho_c}\right)^2 \cdot \sqrt[3]{Qc}}{\mu_c \cdot \nu_c}$$

$$\delta c = 2.47848 \times 10^{-4} \cdot \frac{2 \cdot K_c}{\pi \cdot \mu_c} \cdot \sqrt[3]{\left(\sum \rho_c\right) \cdot Qc^2} \quad (21)$$

In the present invention, it is designed in such manner that the contact stress acted on the contact surface between the ceramic ball 5 and the thread groove 6 is equal to the contact stress acted on the contact surface between the steel ball 4 and the thread groove 6. That is, it is designed in such manner that the relationship $\sigma_{s\,max} = \sigma_{c\,max}$ is satisfied. Therefore, from the above equations (14) and (20), the following equation can be obtained:

$$\sqrt[3]{Qc} = J \cdot \sqrt[3]{Qs} \quad (22)$$

where $$J = \left(\frac{2.22642}{2.35133}\right)^2 \cdot \left(\frac{\mu_c \cdot \nu_c}{\mu_s \cdot \nu_s}\right) \cdot \left(\frac{\sqrt[3]{\sum \rho_s}}{\sqrt[3]{\sum \rho_c}}\right)^2 \quad (23)$$

Also, from the geometrical relationship shown in FIG. 5, the following relationship can be established:

$$\delta s = \delta c' + \frac{Ds - Dc}{2} \approx \delta c + \frac{Ds - Dc}{2} \quad (24)$$

After substituting the equations (15) and (21) to the equation (24), the above equation (2) is further substituted in it. Then, the following equation can be obtained:

$$\left\{\left(2.76439 \cdot \frac{2 \cdot K_s}{\pi \cdot \mu_s} \cdot \sqrt[3]{\sum \rho_s}\right) - \left(2.47848 \cdot \frac{2 \cdot K_c}{\pi \cdot \mu_c} \cdot J^2 \cdot \sqrt[3]{\sum \rho_c}\right)\right\} \cdot$$

$$\left(\sqrt[3]{Qs}\right)^2 \times 10^{-4} = \frac{Ds - Dc}{2} \quad (25)$$

On the other hand, the equation (3) is substituted in the above equations (1) and (2), and the above equation (22) is further substituted in it. Then, the following equations can be obtained:

$$Qs = \frac{P}{T \cdot \sqrt{(\pi \cdot Dm)^2 + L^2}} \cdot \frac{Ds + Dc}{\sin\beta s + J^3 \cdot \sin\beta c} \quad \text{[Insertion ratio 1 : 1]} \quad (26\text{-}1)$$

$$Qs = \frac{P}{T \cdot \sqrt{(\pi \cdot Dm)^2 + L^2}} \cdot \frac{2 \cdot Ds + Dc}{2 \cdot \sin\beta s + J^3 \cdot \sin\beta c} \quad \text{[Insertion ratio 2 : 1]} \quad (26\text{-}2)$$

$$Qs = \frac{P}{T \cdot \sqrt{(\pi \cdot Dm)^2 + L^2}} \cdot \frac{3 \cdot Ds + Dc}{3 \cdot \sin\beta s + J^3 \cdot \sin\beta c} \quad \text{[Insertion ratio 3 : 1]} \quad (26\text{-}3)$$

Next, the above equations (26-1), (26-2) or (26-3) are substituted in the above equation (25). Then, the following equation can be obtained:

In case the insertion ratio is 1:1, $$\left\{\left(2.76439 \cdot \frac{2 \cdot K_s}{\pi \cdot \mu_s} \cdot \sqrt[3]{\sum \rho_s}\right) - \left(2.47848 \cdot \frac{2 \cdot K_c}{\pi \cdot \mu_c} \cdot J^2 \cdot \sqrt[3]{\sum \rho_c}\right)\right\} \times$$

$$\left(\frac{P}{T \cdot \sqrt{(\pi \cdot Dm)^2 + L^2}} \cdot \frac{Ds + Dc}{\sin\beta s + J^3 \cdot \sin\beta c}\right)^{2/3} \times$$

$$10^{-4} = \frac{Ds - Dc}{2} \quad (27\text{-}1)$$

In case the insertion ratio is 2:1, $$\left\{\left(2.76439 \cdot \frac{2 \cdot K_s}{\pi \cdot \mu_s} \cdot \sqrt[3]{\sum \rho_s}\right) - \left(2.47848 \cdot \frac{2 \cdot K_c}{\pi \cdot \mu_c} \cdot J^2 \cdot \sqrt[3]{\sum \rho_c}\right)\right\} \times$$

$$\left(\frac{P}{T \cdot \sqrt{(\pi \cdot Dm)^2 + L^2}} \cdot \frac{2 \cdot Ds + Dc}{2 \cdot \sin\beta s + J^3 \cdot \sin\beta c}\right)^{2/3} \times$$

$$10^{-4} = \frac{Ds - Dc}{2} \quad (27\text{-}2)$$

In case the insertion ratio is 3:1, $$\left\{\left(2.76439 \cdot \frac{2 \cdot K_s}{\pi \cdot \mu_s} \cdot \sqrt[3]{\sum \rho_s}\right) - \left(2.47848 \cdot \frac{2 \cdot K_c}{\pi \cdot \mu_c} \cdot J^2 \cdot \sqrt[3]{\sum \rho_c}\right)\right\} \times$$

$$\left(\frac{P}{T \cdot \sqrt{(\pi \cdot Dm)^2 + L^2}} \cdot \frac{3 \cdot Ds + Dc}{3 \cdot \sin\beta s + J^3 \cdot \sin\beta c}\right)^{2/3} \times$$

$$10^{-4} = \frac{Ds - Dc}{2} \quad (27\text{-}3)$$

If the values of Ds, f, $\beta s$, Dm, P, T and L are already known, it is possible to obtain approximate value of Dc, at which the relationship of the above equations (27-1), (27-2) or (27-3) exists under the assumption of $\beta c \approx \beta s$. This can be accomplished by successive calculation method called Newton-Raphson method by using computer. (For instance, see "Application Technique of Ball Screw", ibid., p.191.)

Next, description will be given on the result of application of the above calculation equations to nominal type No. 40TFC10 of the product designed by the present assignee. (See Tsubaki Nakashima General Catalog", 1st edition (Apr. 1, 1996), by the present assignee, pp. A-36 to A-37.)

First, it is assumed that only the steel balls 4 are inserted in 40TFC10, and the value of diameter Ds of the steel ball 4 is 6.3500 mm when the axial clearance is eliminated or at a given value. Also, it is supposed that the value of the axial load P applied on 40TFC10 is 5000 N. Then, when the insertion ratio of the steel balls 4 to the ceramic balls 5 is 1:1, the approximate value of the diameter Dc of the ceramic ball 5, which satisfies the above equation (27-1), is obtained under the condition of Ds=6.3500 [mm], f=0.55, $\beta S \approx \beta c=45$ [°], Dm=41.8 [mm], p=5000 [N], T=2.5×2=5 [turns] and L=10 [mm]. The result is: Dc≈6.3485 [mm]. (No detailed description is given here on the process of calculation.) Specifically, it may be designed in such manner that the ceramic balls 5 each having a diameter by 1.5 $\mu$m smaller than the diameter (6.3500 mm) of the steel ball 4 are arranged between the adjacent steel balls. Incidentally, the rolling element load Qs acted on the steel ball 4 in this case is turned to Qs≈79.3 [N] from the above equation (26-1). The rolling element load Qc acted on the ceramic ball 5 is Qc≈57.0 [N] from the above equation (22). The number Ms of the steel ball 4 and the number Mc of the ceramic ball 5 when the total number of effective turns is 2.5×2 [turns] are obtained from the above equation (1) as: Ms=Mc≈51.9. The long axis radius $a_s$ and short axis radius $b_s$ of the contact ellipse of the steel balls 4 and the thread groove 6 are obtained from the equations (12) and (13) as: $a_s$≈0.362 [mm] and $b_s$=0.071 [mm] respectively. Long axis radius $a_c$ and short axis radius $b_c$ of the contact ellipse of the ceramic balls 5 and the thread groove 6 are obtained from the above equations (18) and (19) as: $a_c$≈0.307 [mm] and $b_c$≈0.060 [mm] respectively. The maximum contact stress $\sigma_{s\,max}$ acted at the central portion of the contact ellipse of the steel ball 4 and the thread groove 6 and the maximum contact stress $\sigma_{c\,max}$ acted at the central portion of the contact ellipse of the ceramic ball 5 and the thread groove 6 are obtained from the above equations (14) and (20) as: $\sigma_{s\,max}=\sigma_{c\,max}$≈1481 [N/mm$^2$]=1.481 [GPa]. Further, the elastic approach amount $\delta_s$ of the steel ball 4 and the thread groove 6 is obtained from the above equation (15) as $\delta_s$≈0.00273 [mm]=2.73 [$\mu$m]. The elastic approach amount $\delta_c$ of the ceramic ball 5 and the thread groove 6 is obtained from the above equation (21) as $\delta_c$≈0.00198 [mm]=1.98 [$\mu$m].

If it is supposed that the value of the axial load P is 17700 N (basic load rating when rating life is 250 km), the approximate value of the diameter Dc of the ceramic ball 5 to satisfy the above equation (27-1) is calculated as Dc=6.3464 [mm]. That is, the diameter of the ceramic ball 5 is by 3.6 $\mu$m smaller than the diameter (6.3500 mm) of the steel ball 4. Incidentally, the rolling element load Qs acted on the steel ball 4 in this case is: Qs≈281.1 [N], and the rolling element load Qc acted on the ceramic ball 5 is: Qc≈201.6 [N]. Also, the maximum contact stress $\sigma_{s\,max}$ acted at the central portion of the contact ellipse of the steel ball 4 and the thread groove 6 and the maximum contact stress $\sigma_{c\,max}$ acted at the central portion of the contact ellipse of the ceramic ball. 5 and the thread groove 6 are given as: $\sigma_{s\,max}=\sigma_{c\,max}$≈2.259 [GPa]. Further, the elastic approach amount $\delta s$ of the steel ball 4 and the thread groove 6 is given as: $\delta s$≈6.41 [$\mu$m], and the elastic approach amount $\delta c$ of the ceramic ball 5 and the thread groove 6 is given as: $\delta c$=4.61 [$\mu$m].

Figure 6:
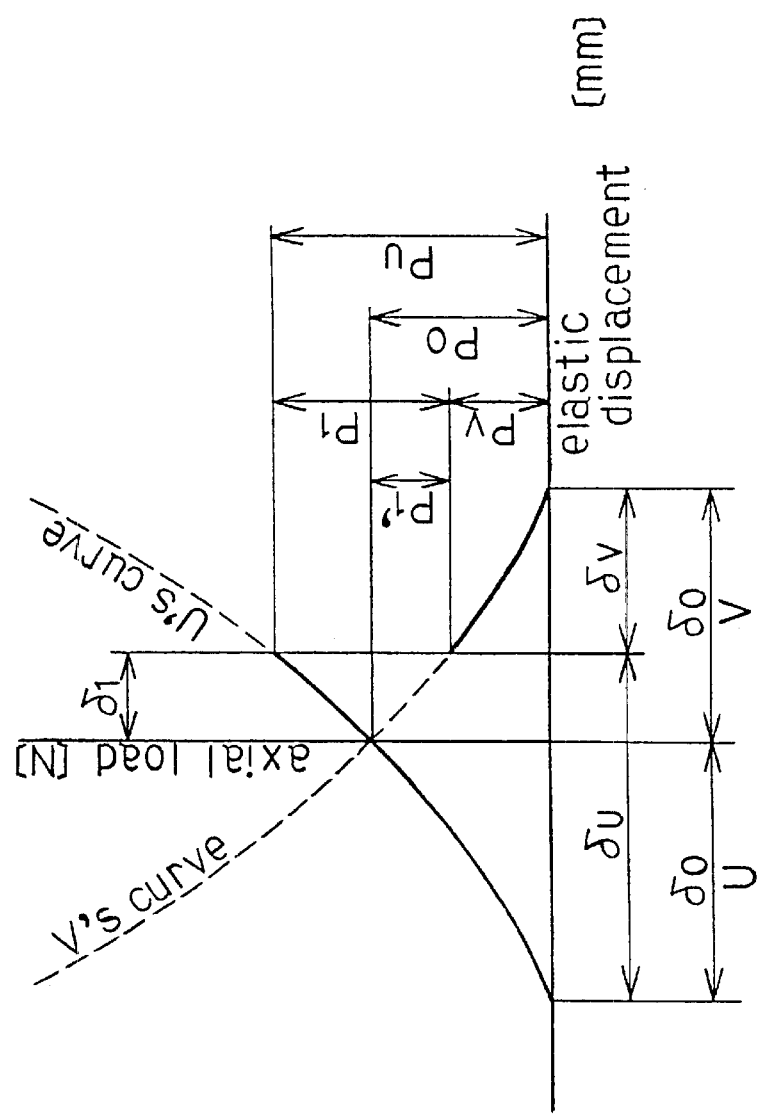
FIG. 6 is a diagram showing fixed position preloading in case of over-sized ball under preloading of FIG. 2(a) or a case of lead-shift under preloading of FIG. 2(b).

Next, description is given on a method to set the diameter Dc [mm] of the ceramic ball 5 to the diameter Ds [mm] of the steel ball 4 referring to FIG. 6 when fixed position preloading is applied on a single nut ball screw shown in FIG. 1 (the case of over-sized ball under pre-loading shown in FIG. 2(a) or the case of lead-shift under preloading shown in FIG. 2(b)). FIG. 6 is a diagram of fixed position preloading, showing the relationship between the elastic approach amount and the axial load in the contact between the steel ball 4 and the thread groove 6. (It is also a diagram of fixed position preloading, showing the relationship between the elastic approach amount and the axial load in the contact between the ceramic ball 5 and the thread groove 6.) The symbols U and V in this diagram show respectively the side where the axial load is applied and the side where the axial load is not applied.

Here, it is assumed that the steel ball 4 and the thread groove come closer to each other by $\delta_0$ [mm] due to the elastic approach. When the axial load $P_1$ [N] is applied under this condition, the values of elastic approach amount $\delta_u$ and $\delta_v$ [mm] of U and V respectively are as follows:

$$\delta_U=\delta_0+\delta_1,\ \delta_V=\delta_0-\delta_1$$

In this case, the values of the axial load $P_U$ and $P_V$ [N] of U and V are respectively as follows:

$$P_U=P_0+P_1-P_1',\ P_V=P_0-P_1'$$

According to the analysis of the present assignee, the axial load $P_U$ of U, i.e. the value of the right-hand member "$P_0+P_1-P_1'$" in the above equation at left is given as follows:

$$P_0 + P_1 - P_1' = \left(\frac{P_1}{\sqrt{8}\cdot P_0} + 1\right)^{3/2} \cdot P_0$$

Then, if the values of the diameter Ds [mm] of the steel ball 4, the preload $P_0$ [N] and the axial load $P_1$ [N] are already given, the value of "P" in the above equations (27-1), (27-2) and (27-3) is substituted by "$P_U$". That is, $$P = \left(\frac{P_1}{\sqrt{8}\cdot P_0} + 1\right)^{3/2} \cdot P_0$$

Thus, the approximate value of the diameter Dc [mm] of the ceramic ball 5 should be obtained as described above, which may satisfy the applied equation. Maximum value of the pre load $P_0$ [N] is considered to be less than 25% of the basic dynamic load rating when rating life is set to 250 km or less than 10% of the basic dynamic load rating when service life is set to 1,000,000 rotations (less than 5% in case of over-sized ball under preloading).

In the first embodiment as described above, description has been given on "single-nut ball screw", while the present invention may be applied to "double-nut pre-loading type ball screw" not shown in the figure.

Next, description will be given on "double-nut preloading type ball screw", i.e. a second embodiment of the present invention. To facilitate the explanation, the same expressions and symbols as in the first embodiment are used. The method to provide the ball circulating passage is based on the return tube method.

Similarly to the first embodiment, in the double-nut preloading type ball screw, a plurality of steel balls 4 and ceramic balls 5 having characteristic values shown in Table 1 are alternately disposed in ratios of 1:1, 2:1 or 3:1 between the two thread grooves 6 and 7 in form of gothic arc and in a return tube 4. (See FIG. 1 and FIG. 3.) If it is assumed that the diameters of the steel ball 4 and the ceramic ball 5 are Ds and Dc respectively, the diameter Dc of the ceramic ball 5 is designed to be smaller than the diameter Ds of the steel ball so that contact stress acted on the contact surface of the ceramic ball 5 and the two thread grooves 6 and 7 will be equal to contact stress acted on the contact surface of the steel ball 4 and the two thread grooves 6 and 7. (See FIG. 5.) The screw shaft and two ball nuts are made of chromium-molybdenum steel SCM415H or SCM420H. Surface hardness is held in 58–62 by carburizing and quenching and by tempering. Assuming that the fitting rate of the steel balls 4 and the two thread grooves 6 and 7 is f (f=0.52–0.58), the radius of curvature of the two thread grooves 6 and 7 is f·Ds.

Next, description will be given on a method to set the diameter Dc [mm] of the ceramic ball 5 with respect to the diameter Ds [mm] of the steel ball 4. The method for the setting is the same as that of the first embodiment, and detailed description is not given here.

(1) In Case of Fixed Position Preloading

This is the same as in the case of single-nut ball screw under fixed position preloading as described above.

Therefore, if the values of the diameter Ds [mm] of the steel ball 4, the preload $P_0$ [N], and the axial load $P_1$ [N] are already known, the value of "P" in the above equations (27-1), (27-2) and (27-3) is set to:

$$P = \left(\frac{P_1}{\sqrt{8} \cdot P_0} + 1\right)^{3/2} \cdot P_0$$

and approximate value of the diameter Dc [mm] of the ceramic ball 5 should be obtained, which can satisfy the equation to be applied.

(2) In Case of Fixed Pressure Preloading

In this case, the diagram of preloading will be as shown in FIG. 5.8 and FIG. 5.9 in "Application Technique of Ball Screw" as given above, p.63 (not given here).

Thus, if the values of the diameter Ds [mm] of the steel ball 4, the pre-load $P_0$ [N], and the axial load $P_1$ [N] are known, the value of "P" in the above equations (27-1), (27-2) and (27-3) is set to "$P_0+P_1$" for the ball nut where the axial load $P_1$ is applied. It is set to "$P_0$" for the other ball nut on the other side. Then, the approximate value of the diameter Dc [mm] of the ceramic ball 5 should be obtained, which satisfies the equation to be applied.

In the above embodiment, description has been given on ball screw of return tube type in the formation of ball circulation passage, while it is needless to say that the invention can be applied to the ball screw of insert piece type, end cap type or guide plate type.

As described above, the ball screw of the present invention comprises a screw shaft made of steel having a thread groove on outer peripheral surface, a ball nut made of steel and having a thread groove on inner peripheral surface opposed to the thread groove of the screw shaft and a plurality of balls to be inserted between the two thread grooves and recirculated along a ball circulation passage provided in the ball nut. As these balls, steel balls made of bearing steel and ceramic balls made of silicon nitride are alternately disposed at a given ratio. Further, the diameter of the ceramic ball is set to a value smaller than the diameter of the steel ball so that contact stress acted on the contact surface of the ceramic balls and the two thread grooves will be equal to contact stress applied on the contact surface of the steel balls and the two thread grooves.

When high-speed feeding is performed, the following effects can be obtained;

(1) In comparison with the conventional type ball screw with "only steel balls" inserted:

① Heat generation is low, and elongation of the screw shaft due to temperature increase can be reduced. Also, when preloading is applied on the ball screw, it is possible to suppress the increase of preload value caused by temperature increase due to high-speed rotation of the screw shaft. Therefore, positioning accuracy as required can be maintained.

② Noise during ball screw operation can be reduced.

③ In case of a return tube type ball screw, the probability to damage the tongue of the return tube can be reduced. Also, damage on the thread groove of the screw shaft can be minimized.

(2) In comparison with the conventional type ball screw with "only ceramic balls" inserted:

① When preloading is applied on the ball screw, even when preload is lost as result of occurrence of axial clearance between the ceramic balls and the two thread grooves due to temperature increase, the preload between the steel balls and the two thread groove is not lost. As a result, positioning accuracy as required can be maintained. Also, in this case, the ceramic balls serve as spacer balls, and this contributes to the improvement of workability during high-speed feeding. When the insertion ratio of the steel balls to the ceramic balls is set to 1:1, the axial load to be born is decreased to one-half. Thus, it is preferable to set the insertion ratio to 2:1 or 3:1.

② Service life will be extended. That is, it will be as long as the service life of the ball screw with "only steel balls" inserted.

③ Ceramic balls and thread grooves come closer to each other by elastic approach after elastic approach occurs between the steel balls and the thread grooves. Thus, even when shock load is applied, indentation hardly occurs on the thread grooves.

④ Production costs may be suppressed.

What is claimed is:

1. A ball screw comprising a screw shaft having a thread groove on an outer peripheral surface, a ball nut having a thread groove on an inner peripheral surface opposed to the thread groove of the screw shaft and a plurality of balls inserted between said thread grooves and recirculated along a ball circulation passage provided in the ball nut, wherein the screw shaft and the ball nut are made of steel and steel balls made of bearing steel and ceramic balls made of silicon nitride are disposed alternately at a given ratio as said balls; and the diameter of each ceramic ball is smaller than that of each steel ball so that contact stress acted upon each contact surface between the ceramic ball and the thread grooves is equal to contact stress acted upon each contact surface between the steel ball and the thread grooves.

* * * * *